Figure 5:
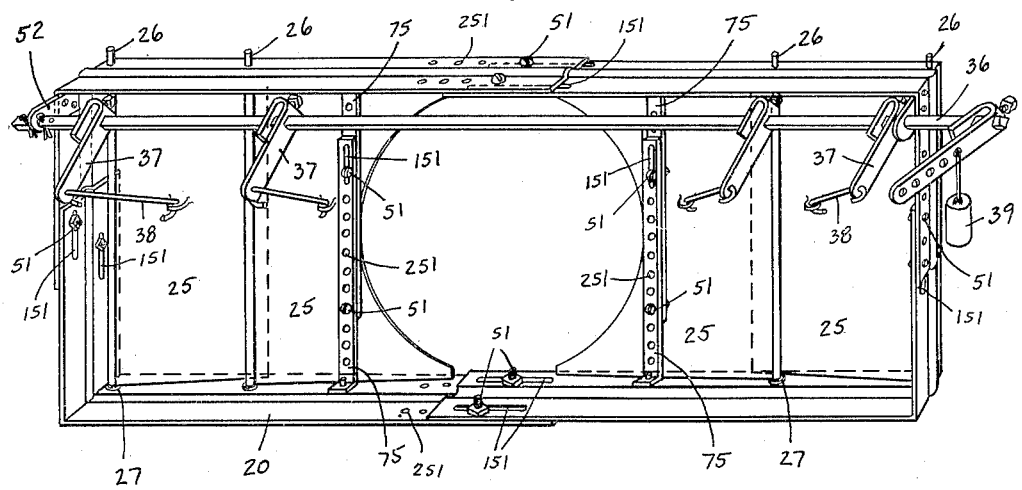

Aug. 13, 1929. J. M. LIEBER 1,724,209
FORCED CIRCULATION FOR HOT AIR FURNACES
Filed June 25, 1928 2 Sheets-Sheet 1
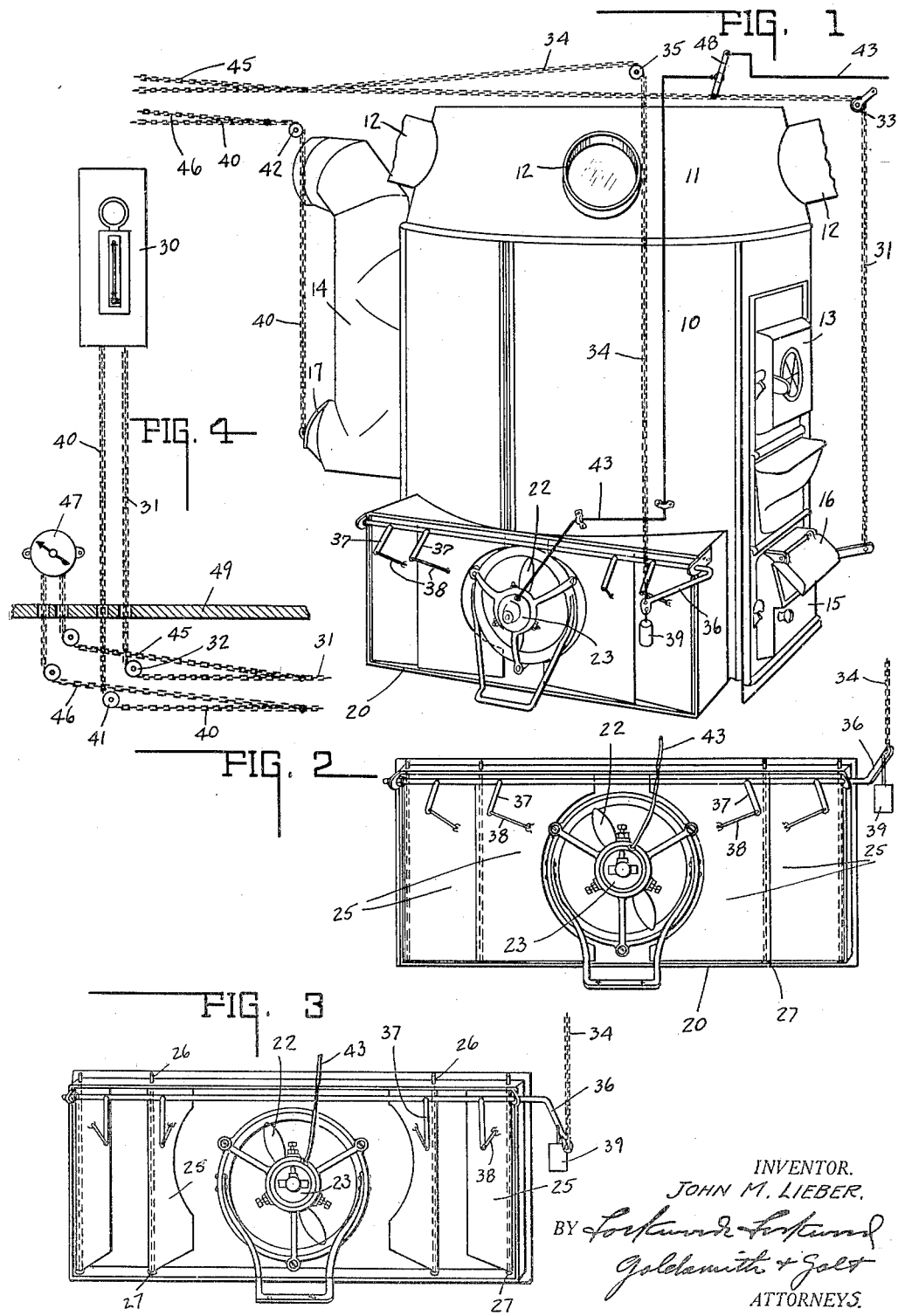
INVENTOR.
JOHN M. LIEBER.
BY
ATTORNEYS.

INVENTOR.
JOHN M. LIEBER,
BY *Lockwood Lockwood*
*Goldsmith & Galt*
ATTORNEYS.

Patented Aug. 13, 1929.

1,724,209

UNITED STATES PATENT OFFICE.

JOHN M. LIEBER, OF HARTFORD CITY, INDIANA.

FORCED CIRCULATION FOR HOT-AIR FURNACES.

Application filed June 25, 1928. Serial No. 288,251.

The chief object of this invention is to boost or force the circulation in hot air furnaces and thereby greatly increase and, in fact, substantially double the efficiency thereof.

In the ordinary hot air furnace the movement of the air in the hot air chamber through the hot air pipes to the rooms or building arises from such air becoming heated by the furnace. This causes a relatively sluggish air movement and a slow movement of the air renders the furnace relatively inefficient, although the furnace chamber may be very hot. A rapid movement of the air around the furnace chamber not only conveys more rapidly the hot air to the rooms or building to be heated, but it also reduces the excess heated condition of the furnace chamber and prevents it from becoming too hot. Hence, this booster co-operates with the heat from the furnace to move the air in the furnace chamber and therefrom to the rooms or building to be heated.

Another feature of the invention consists in providing means for starting and stopping such air-boosting apparatus automatically and preferably by reason of the temperature in the room or house to be heated.

The full nature of this invention will be more fully understood from the accompanying drawings and the following description and claims.

In the drawings, Fig. 1 is a perspective view of a hot air furnace containing said invention and means for controlling the same. Fig. 2. is an elevation of the fan and shutters controlled in the lower part of the furnace shown in Fig. 1 with the shutters closed. Fig. 3 is the same as Fig. 2 with the shutters opened. Fig. 4 is a vertical section thru the floor above the furnace and side elevations of furnace control means with chain being partially broken away. Fig. 5 is a perspective view of the preferable construction of the air box.

There is shown in Fig. 1 a hot air furnace of the ordinary type in which there is a surrounding hot air chamber 10 and an upper hot air chamber 11 from which hot air pipes 12 lead to the rooms of the building to be heated. Within the furnace there is the usual furnace chamber not shown to which fuel is supplied through the furnace door 13 and from which a flue 14 leads to the chimney not shown. There is an ash pit door 15 and the draft damper 16 and a flue damper 17 of the usual type.

The invention consists in providing an air box 20 at the side of the furnace near the floor, as shown in Fig. 1, which is in communication with the air chambers 10 and 11. In this air box 20, the fan 22 is mounted and is operated by the electric motor 23 so that the fan will blow the air through the hot air chamber, around the furnace chamber and out through the hot air pipes 12 to the rooms of the building being heated.

The air box 20 is controlled by a number of shutters 25 as seen in Figs. 2 and 3 where four of them are shown extending vertically and pivoted by pins 26 and 27 at the top and bottom thereof which extend into the wall of the air box. The two middle shutters are partially cut out next to the fan 22 and the shutters are so placed as to slightly overlap each other and tightly close the air box 20, as shown in Fig. 2, and when opened, as shown in Fig. 3, they admit air to the air box and the hot air chamber of the furnace.

The air box 20, as shown here, has openings from the furnace room of a residence, but the air box 20 may be connected with the usual return air pipe or air conduit not shown but which is common in furnace construction. In other words, the air box will take air from either the return pipe or from the furnace room.

The furnace is preferably controlled from the thermostat 30 in the room to be heated, operated through the chain 31 to open the furnace damper 16 and running over pulleys 32 and 33 and also a companion chain 34 running over pulley 35 down to the crank rod 36 for opening the shutters 25 to the air box 20. The crank rod 36 has arms 37 flexibly connected by means 38 with the said shutters. When said lines 31 and 34 are pulled, the furnace damper 16 is opened and also the shutters closed to the air box 20, and, when they are relaxed, gravity will close the furnace damper 16 and the weight 39 will close the shutters 25. Also the flue damper 17 will be opened by the thermostat pulling on chain 40 that runs over pulleys 41 and 42 and gravity will close damper 17.

Also, the thermostat 30, through chain 31, moves switch 48 and controls the electric line 43 to start and stop the electric motor 23. The device may also be provided with a manual control through chains 45 and 46 to the manually-operated means 47 in the room above the floor 49. Chain 45 is connected with chain 31 for controlling the furnace and flue dampers, and the electric switch for controlling the motor, and chain 46 is connected with chain 44 for controlling the air shutters 25.

When the temperature of the room above is too low, the thermostat will open the furnace damper and close the flue damper and also start the fan 23 and close the shutters 25 of the air box 20, in which the fan is located. Then all the air will pass through the fan with forced draft and this will speed up the heat of the furnace and also the air movement around the furnace chamber in the air chamber and hot air pipes leading to the rooms above. When the maximum temperature is reached, the thermostat will exert a gradual influence over the control of the furnace, stopping the fan, opening the shutters 25 and the furnace damper 16, and open the flue damper 17. The manual control may also be used when it is desired for accomplishing the same results in controlling the furnace.

Whenever the fan is operated and the shutters closed, it is obvious that there will result a more rapid hot air movement in the hot air chamber and it will supply more hot air to the rooms above and, at the same time, reduce the temperature of the fire box by taking heat therefrom and sending it to the rooms above, with a result that the efficiency of the furnace will be greatly increased over furnaces as heretofore made and operated without the fan or said fan and the associated parts.

The preferable construction of the air box 20 is shown in detail in Fig. 5, with a fan and parts for operating the shutters omitted. This preferable construction of air box is one which permits adjustability of its length and height to fit variations in the dimensions of the opening of the furnace in which said air box is to be located. A central opening is left as shown between the inner shutters 25, where the fan is located after the air box has been installed.

The air box 20 is preferably formed in four angular sections or parts with their ends adapted to overlap each other between the corners of the box, as appears in Fig. 5.

One set of overlapping ends is provided with slots 151 through which bolts 51 extend and said bolts 51 are in holes 251 in the other overlapping ends. By releasing the nuts on the bolts, the ends of the sections can be longitudinally and vertically adjusted so as to vary the length from 36 inches to 48 inches and the height from 12 inches to 20 inches or the like. There is a plurality of holes 251 so that the bolts 51 can be placed in any desired hole.

The separate sections of the box can be taken to the location of the furnace and can there be fitted in the air box opening regardless of slight variations in the size thereof and the fan be mounted in the central opening of the fire box. In such arrangement the inner shutters 25 are stopped and held in closing position by bars 75 formed in two sections with turned ends bolted to the top and bottom sections of the air box and overlapping each other and the length rendered adjustable by means of the bolts 51, slots 151 and holes 251, the same as the other elements of the air box.

The invention claimed is:

1. The combination with a hot air furnace having a hot air chamber and hot air pipes, of an air box in the lower part of said hot air chamber, a fan in said air box for forcing air into and through said hot air chamber, shutters for controlling the admission of air through said air box, and thermostatic means responsive to room temperature for controlling the furnace and fan and said shutters.

2. The combination with a hot air furnace having a hot air chamber and hot air pipes, of an air box in the lower part of said hot air chamber, a fan in said air box for forcing air into and through said hot air chamber, shutters for controlling the admission of air through said air box, and thermostatic means responsive to room temperature for simultaneously starting said fan and closing said shutters and stopping said fan and for closing said shutters.

3. The combination with a hot air furnace having a hot air chamber, hot air pipes and fire control dampers, of a fan adapted to force air into and through said chamber and said hot air pipes, means for admitting air to said hot air chamber, and means for simultaneously starting the fan, closing said air-admitting means and operating said fire control dampers.

4. The combination with a hot air furnace having a hot air chamber, hot air pipes and fire control dampers, of a fan adapted to force air into and through said chamber and said hot air pipes, means for admitting air to said hot air chamber, and automatic means for simultaneously starting the fan, closing said air-admitting means and operating said fire control dampers.

5. The combination with a hot air furnace having a hot air chamber, hot air pipes and fire control dampers, of a fan adapted to force air into and through said chamber and said hot air pipes, and means for simultaneously starting the fan and operating said fire control dampers.

6. The combination with a hot air furnace having a hot air chamber, hot air pipes and fire control dampers, of a fan adapted to force air into and through said chamber and said hot air pipes, and automatic means for simultaneously starting the fan and operating said fire control dampers.

In witness whereof, I have hereunto affixed my signature.

JOHN M. LIEBER.